United States Patent
Prabhu et al.

[11] Patent Number: 5,953,240
[45] Date of Patent: Sep. 14, 1999

[54] SIMD TCP/UDP CHECKSUMMING IN A CPU

[75] Inventors: J. Arjun Prabhu, Palo Alto; Denton E. Gentry, Fremont, both of Calif.

[73] Assignee: Sun Microsystems, Inc., Palo Alto, Calif.

[21] Appl. No.: 08/880,925

[22] Filed: Jun. 23, 1997

[51] Int. Cl.$^6$ ............................ G06F 11/00; G06F 11/10; G06F 7/50
[52] U.S. Cl. .............................. 364/737; 364/788; 371/53
[58] Field of Search ...................................... 364/749, 788, 364/787.01–787.04, 737; 371/2.1, 53; 370/252

[56] References Cited

U.S. PATENT DOCUMENTS 5,327,369  7/1994  Ashkenazi ........................... 364/749 X

OTHER PUBLICATIONS

Shipnes, "Graphic Processing with the 88110 RISC Microprocessor" IEEE, 1992, pp. 169–174.

*Primary Examiner*—Chuong Dinh Ngo
*Attorney, Agent, or Firm*—Townsend and Townsend and Crew LLP

[57] ABSTRACT

A CPU adapted to calculate a checksum simultaneously on multiple values packed into a single register. An adder is provided which adds a number of values packed into a first register to a number of packed values from a second register. The adder is constructed, or partitioned, so that the values do not propagate their carry bit to the next value. A special carry bit adder is provided which will add a carry bit out of each partitioned portion back into the sum value to generate the sum required by the checksum protocol.

14 Claims, 5 Drawing Sheets

5,953,240

SIMD TCP/UDP CHECKSUMMING IN A CPU

BACKGROUND OF THE INVENTION

The present invention relates to the generation of checksums, and in particular checksums for the TCP/UDP protocol.

Calculating a checksum is a simple way of testing data integrity. In a simple form, checksumming involves repetitively adding different pieces of data together to produce a checksum. The checksum is then transmitted with the data, and the data can be repetitively added again with the result being compared to the transmitted checksum. If they do not match, the data or the checksum has become corrupted.

A number of different checksum algorithms exist. For the TCP/UDP protocol (used over the Internet, for instance), after a pair of data are added, a carry bit, if there is one, is also added to the result. This is then summed with the next piece of data, and the process is repeated.

Historically, checksums were calculated in the CPU of a computer. Software would run a routine for loading the data, and then compute the sums, and looping through the data to be transmitted.

Subsequently, special purpose network cards were developed which could do the checksum calculation in hardware. This would off-load the burden from the CPU, and at the same time, enable faster calculation by using dedicated circuitry specifically designed for calculating the checksum. A disadvantage of using a network card is that the data is unprotected by the checksum between the CPU and the network card. Accordingly, this is a trade-off which is made.

More recently, more functions have been integrated into the microprocessor or CPU of a computer. As circuit integration has increased to give greater density, and more transistors on a microprocessor, more functions have been added. For example, in addition to processing data at a high rate of speed, some microprocessors now incorporate functions previously performed by special purpose hardware chips, such as graphics calculations.

It would be desirable to be able to use a microprocessor to calculate a checksum in a network application in order to ensure end-to-end security of the data. However, one disadvantage of performing such an operation in a microprocessor today is that microprocessors typically use one or more cache memories to speed up their operation. Since a checksum operation would involve additions of a large amount of data, that would typically use up a significant portion of the cache and overwrite other data necessary for other functions of the microprocessor.

SUMMARY OF THE INVENTION

The present invention provides a CPU adapted to calculate a checksum simultaneously on multiple values packed into a single register. An adder is provided which adds a number of values packed into a first register to a number of packed values from a second register. The adder is constructed, or partitioned, so that the values do not propagate their carry bit to the next value. A special carry bit adder is provided which will add a carry bit out of each partitioned portion back into the sum value to generate the sum required by the checksum protocol.

In a preferred embodiment, the present invention is implemented in a microprocessor having a functional unit with graphics processing capability for performing functions using a single instruction, multiple data (SIMD) protocol with registers and adders so configured. The graphics hardware is adapted for the non-graphics function of the checksum calculation by providing the carry bit adder circuitry in addition to the existing SIMD adder used for graphics functions.

In addition, the present invention takes advantage of a block load operation for a graphics operation which will load a block of data into a register file at one time. Such a block load can be directly from memory, bypassing the level one and level two caches. Graphics operations often require iterative processes to be carried out on a block of data. This capability is also ideally suited for checksum calculation, and avoids using significant portions of the cache for the checksum calculation.

For a further understanding of the nature and advantages of the invention, reference should be made to the following description taken in conjunction with the accompanying drawings.

DESCRIPTION OF THE PREFERRED EMBODIMENT

A particular embodiment of a microprocessor incorporating graphics functional units is described. However, it should be understood that the present invention may be embodied in other forms, including using circuitry without requiring a special graphics unit. Accordingly, the following description is merely one example of how the present invention could be implemented.

Overall CPU Architecture

Figure 1:
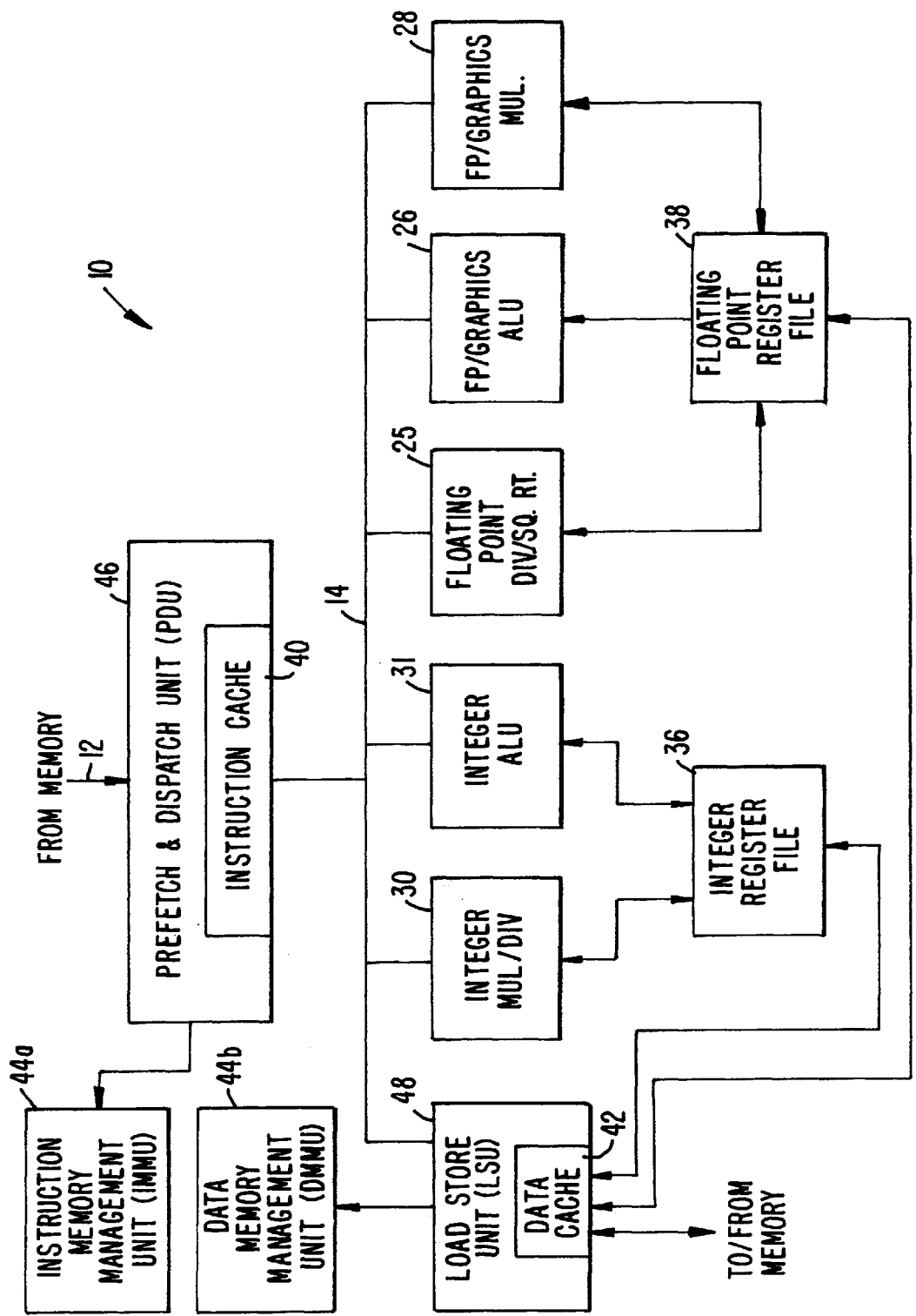
FIG. 1 is a block diagram of one embodiment of the functional units of a microprocessor incorporating the present invention.

Referring now to FIG. 1, a block diagram illustrating the CPU of an exemplary graphics computer system incorporating the teachings of the present invention is shown.

As illustrated, a CPU 10 includes a prefetch and dispatch unit (PDU) 46 connected to an instruction cache 40. Instructions are fetched by this unit from either the cache or main memory on a bus 12 with the help of an instruction memory management unit (IMU) 44a. Data is fetched either from main memory or from a data cache 42 using a load storage unit (LSU) 48 working with a data memory management unit (DMMU) 44b.

PDU 46 issues up to four instructions in parallel to multiple pipelined execution units along a pipeline bus 14. Integer operations are sent to one of two integer execution units (IEU), an integer multiply or divide unit 30 and an integer ALU 31. These two units share access to an integer register file 36 for storing operands and results of integer operations.

Separately, three floating point operation units are included. A floating point divide and square root execution unit 25, a floating point/graphics ALU 26 and a floating point/graphics multiplier 28 are coupled to pipeline bus 14 and share a floating point register file 38. The floating point register file stores the operands and results of floating point and graphics operations.

A floating point adder and floating point multiplier include graphics capability. The graphics capability added to the floating point path allows integer operations to be issued at the same time along pipeline bus 14, thus processing in parallel.

The data path through the floating point units 26 and 28 has been extended to 64 bits in order to be able to accommodate 8—8 bit pixel representations, (or 4–16 bit, or 2–32 bit representations) in parallel. Thus, the standard floating point path of 53 bits plus 3 extra bits (guard, round and sticky or GRS) has been expanded to accommodate the graphics instructions.

Additionally, the IEU also performs a number of graphics operations, and appends address space identifiers (ASI) to the addresses of load/store instructions for the LSU 48, identifying the address spaces being accessed. LSU 48 generates addresses for all load and store operations. LSU 48 also supports a number of load and store operations, specifically designed for graphics data. Memory references are made in virtual addresses. The MMUs 44a–44b include translation look-aside buffers (TLBs) to map virtual addresses to physical addresses.

FP/Graphics ALU 26

Figure 2:
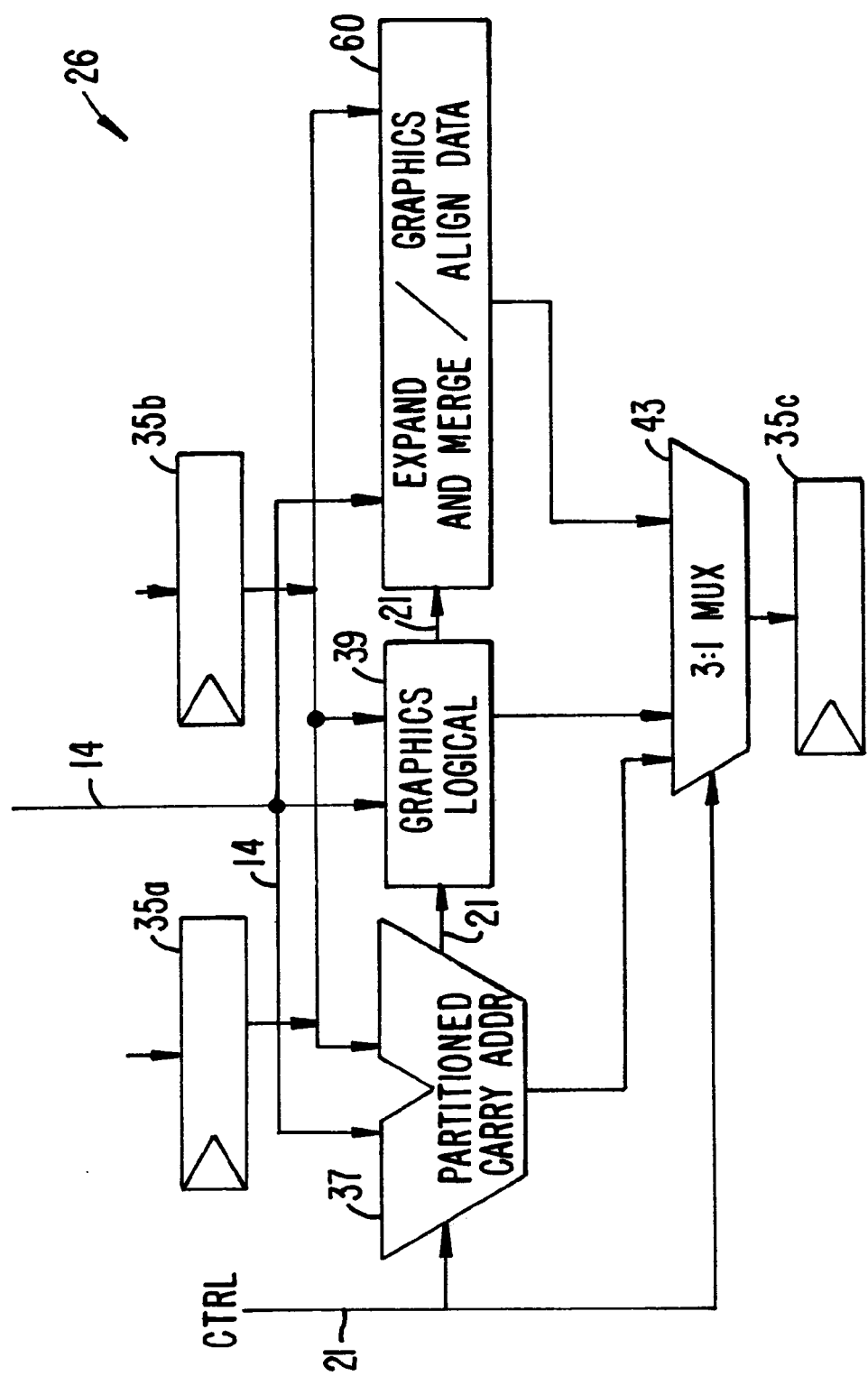
FIG. 2 is a block diagram of a first graphics ALU functional unit of FIG. 1.

Referring now to FIG. 2, a block diagram illustrating the relevant portions of one embodiment of the first partitioned execution path in unit 26 is shown.

Pipeline bus 14 provides the decoded instructions from PDU 46 to one of three functional circuits. The first two functional units, partitioned carry adder 37 and graphics logical circuit 39, contain the hardware typically contained in a floating point adder and an integer logic unit. The circuitry has been modified to support graphics operations. An additional circuit 60 has been added to support both graphics expand and merge operations and graphics data alignment operations. Control signals on lines 21 select which circuitry will receive the decoded instruction, and also select which output will be provided through a multiplexer 43 to a destination register 35c. Destination register 35c, and operand register 35a and 35b are illustrations of particular registers in the floating point register file 38 of FIG. 1.

At each dispatch, the PDU 46 may dispatch either a graphics data partitioned add/subtract instruction, a graphics data alignment instruction, a graphics data expand/merge instruction or a graphics data logical operation to unit 26. The partitioned carry adder 37 executes the partitioned graphics data add/subtract instructions, and the expand and merge/graphics data alignment circuit 60 executes the graphics data alignment instruction using the alignaddr_ offset stored in a global status register. The graphics data expand and merge/graphics data alignment circuit 60 also executes the graphics data merge/expand instructions. The graphics data logical operation circuit 39 executes the graphics data logical operations.

The functions and constitutions of the partitioned carry adder 37 are similar to simple carry adders found in many integer execution units known in the art, except the hardware are replicated multiple times to allow multiple additions/ subtractions to be performed simultaneously on different partitioned portions of the operands. Additionally, the carry chain can be optionally broken into smaller chains.

The functions and constitutions of the graphics data logical operation circuit 39 are similar to logical operation circuits found in many integer execution units known in the art, except the hardware are replicated multiple times to allow multiple logical operations to be performed simultaneously on different partitioned portions of the operands. Thus, the graphics data logical operation circuit 39 will also not be further described.

FP/Graphics Multiply Unit 28

Figure 3:
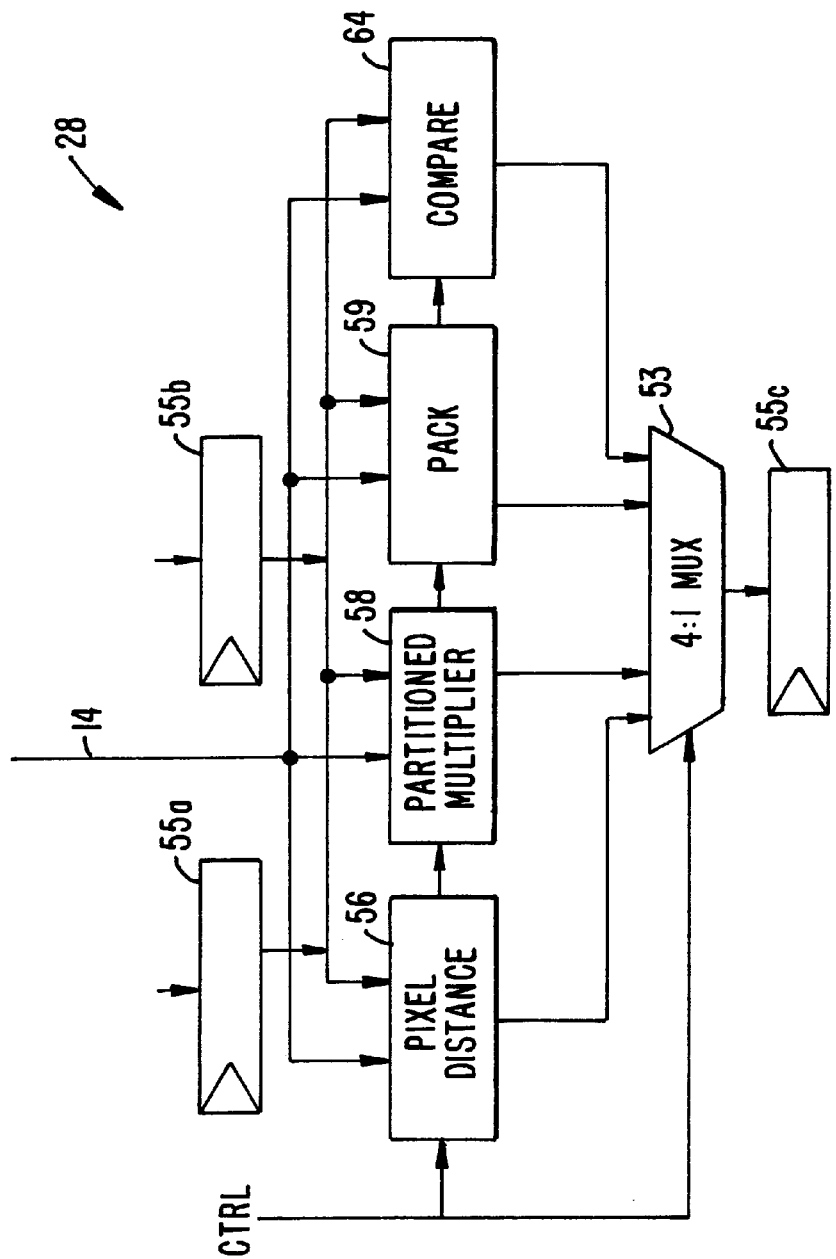
FIG. 3 is a block diagram of a second graphics multiply unit of FIG. 1.

Referring now to FIG. 3, a block diagram illustrating the relevant portion of one embodiment of the FP/graphics multiply unit 28 in further detail is shown. In this embodiment, multiply unit 28 comprises a pixel distance computation circuit 56, a partitioned multiplier 58, a graphics data packing circuit 59, and a graphics data compare circuit 64, coupled to each other as shown. Additionally, a number of registers 55a–55c (in floating point register file 38) and a 4:1 multiplexer 53 are coupled to each other and the previously-described elements as shown. At each dispatch, the PDU 46 may dispatch either a pixel distance computation instruction, a graphics data partitioned multiplication instruction, a graphics data packing instruction, or a graphics data compare instruction to unit 28. The pixel distance computation circuit 56 executes the pixel distance computation instruction. The partitioned multiplier 58 executes the graphics data partitioned multiplication instructions. The graphics data packing circuit 59 executes the graphics data packing instructions. The graphics data compare circuit 64 executes the graphics data compare instructions.

The functions and constitutions of the partitioned multiplier 58, and the graphics data compare circuit 64 are similar to simple multipliers and compare circuits found in many integer execution units known in the art, except the hardware are replicated multiple times to allow multiple multiplications and comparison operations to be performed simultaneously on different partitioned portions of the operands. Additionally, multiple multiplexers are provided to the partitioned multiplier for rounding, and comparison masks are generated by the comparison circuit 64.

Checksum

Figure 4:
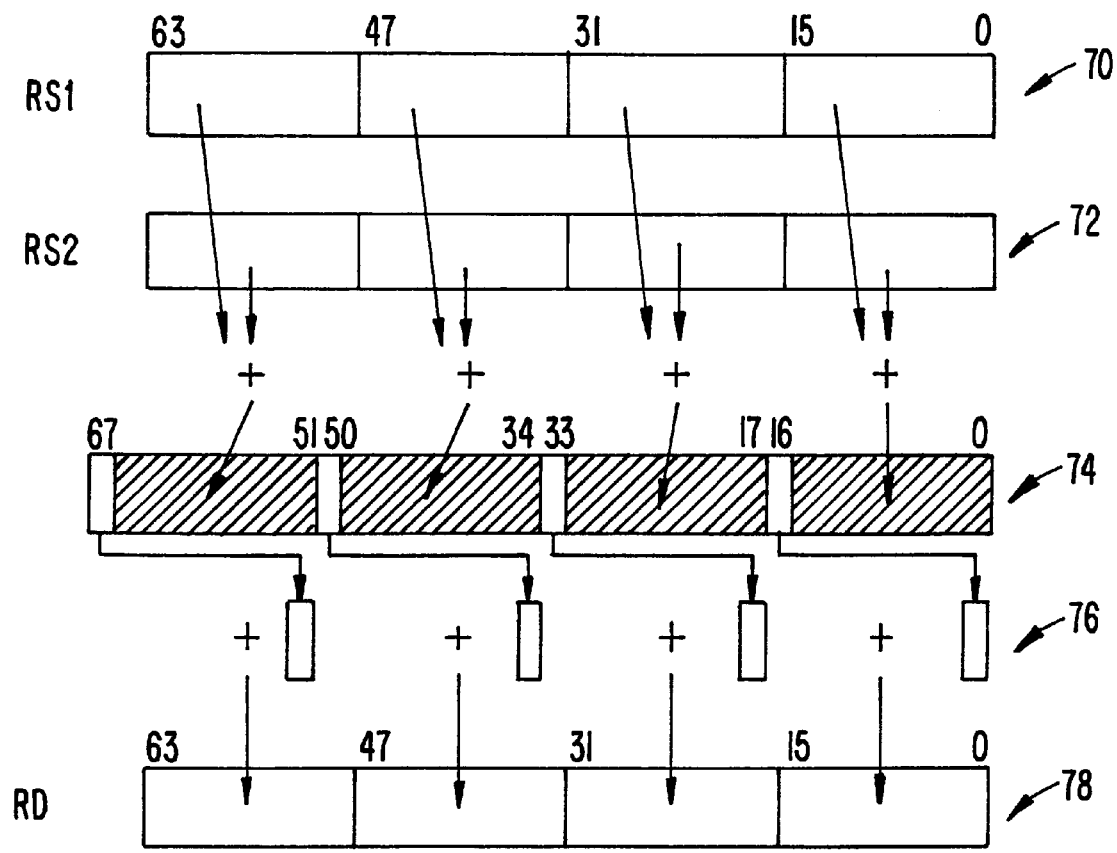
FIG. 4 is a diagram illustrating checksum calculation using partitioned registers according to the present invention.

FIG. 4 illustrates the performance of a checksum according to the present invention utilizing partitioned data. Registers 70 and 72 (RS1, RS2) each contain four 16 bit values. These are added together to produce four sums in register 74, as shown in the shaded area. The clear area is a portion not stored, and is the carry bit which is typically discarded in a partitioned add operation. Here, however, the four carry bits 76 are added to the sum 74 to produce the final four checksum values 78.

The value in RD register 78 can then be used as one of the registers for the next add, and the process can be repeated, until an entire block of data is processed.

Figure 5:
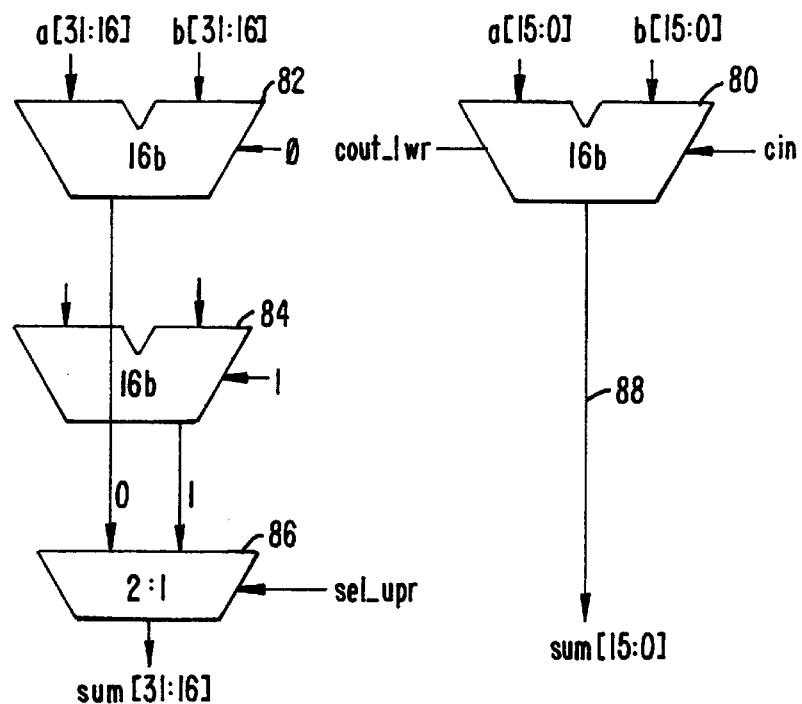
FIG. 5 is a diagram of a partitioned adder of FIG. 2 used for graphics operations before incorporating the present invention.

FIG. 5 illustrates a portion of the circuitry of a partitioned carry adder 37 of FIG. 2. As shown, there are two adders 80 and 82. Adder 80 receives the first 16 bits from each of the registers 70 and 72 of FIG. 4, while adder 82 receives the second 16 bits. This circuitry can be duplicated for the second 32 bits of the 64 bit sum. The signals referred to in FIG. 5 are defined as follows:

Definitions of "external control signals" (the first 3, sub, sub16 and p32 are operation control signals not shown in the figure).

| | | |
|---|---|---|
| sub | = | 16-bit or 32-bit partitioned subtraction |
| sub16 | = | 16-bit partitioned subtaction |
| p32 | = | 32-bit partitioned operation (addition or subtraction) | equations for "internal control signals":

| | | |
|---|---|---|
| cout_lwr | = | carry out of lower 16b adder |
| cin | = | sub |
| sel_upr | = | sub16 \| (p32 & cout_lwr) | where | means OR, and & means AND.

Adder 82 is partitioned so that it does not receive a carry in from the separate data values of adder 80. Instead, a zero is added in. However, the circuit of FIG. 5 can be configured not only to add multiple 16 bit values, but to add 32 bit values. When 32 bit values are added, a second adder 84 can be used, with a one bit provided for the carry. Thus, depending upon the actual value of a carry from adder 80 for a 32 bit value, either adder 82 (carry bit 0) or 84 (carry bit 1) is selected by a multiplexer 86. As can be seen, adder 80 will not have such a carry, and its output is provided directly on a line 88 as an output. This circuit of FIG. 5 is duplicated for the next 32 bits, with the first portion again not having any carry in and no carry circuitry, while the second 16 bits does.

Figure 6:
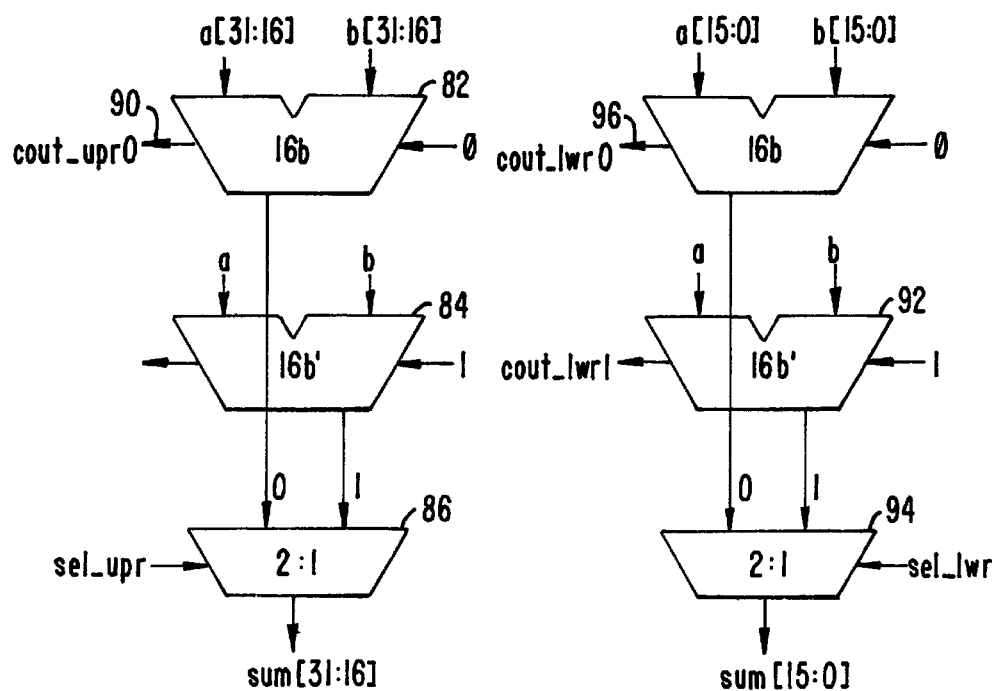
FIG. 6 is a diagram of the circuit of FIG. 4 modified in accordance with the present invention.

FIG. 6 illustrates how the circuitry of FIG. 5 can be modified to allow the circuitry, designed for graphics operations, to be modified to perform a checksum. For a checksum, the carry bit of each 16 bit portion is added back to the sum. This carry bit can be provided on a line 90 out of adder 82. Rather than adding it back in, it is recognized that the carry bit will either be a zero or one. Accordingly, the result of adding it will either be the sum from adder 82 or the sum from 84. Accordingly, the signal on line 90 can simply be provided as the control signal for multiplexer 86 to select the appropriate value, thus giving the equivalent of adding back in the carry bit.

For the first portion of the circuitry, there simply needs to be added an additional adder 92 and multiplexer 94, much like adder 84 and multiplexer 86. Similarly, a carry out signal on line 96 is used to select which value from the multiplexer. This thus provides the carry addition function described in FIG. 4. The signals referred to in FIG. 6 are defined as follows:

Definitions of "external control signals"

| | | |
|---|---|---|
| sub | = | 16-bit or 32-bit partitioned subtraction |
| sub16 | = | 16-bit partitioned subtraction |
| add32 | = | 32-bit partitioned addition |
| sub32 | = | 32-bit partitioned subtraction |
| chksum16 | = | checksum16 operation | equations for "internal control signals":

| | | |
|---|---|---|
| cout_lwr0 | = | carry out of lower 16b adder with cin = 0 |
| cout_lwr1 | = | carry out of lower 16b adder with cin = 1 |
| cout_upr0 | = | carry out of upper 16b adder with cin = 0 |
| sel_lwr | = | sub \| (chksum16 & cout_lwr0) |
| sel_upr | = | sub16 \| (add32 & cout_lwr0) \| (checksum16 & cout_upr0) \| (sub32 & cout_lwr1) |

The equation for the select signal for the multiplexers show not just the checksum control, but how it is integrated into the control logic for other operations.

An additional advantage of the structure set forth in FIG. 6 is that the real estate on the chip necessary for adder 92 and multiplexer 94 is already available as empty space as shown in FIG. 5. For the sake of symmetry, no other circuitry is placed in the position of line 88 of FIG. 5, thus leaving it open for adding in the circuitry shown in FIG. 6.

Preferably, the circuitry of FIG. 6 is used to perform multiple operations as illustrated in FIG. 4, on a block of data loaded from the floating point register file. The data is loaded using a block load operation as described above. As can be seen, since multiple iterative operations are done on data in the register file, the cache is not polluted with the checksum operations. This checksum operation uniquely takes advantage of a feature common to graphics operations, that the intermediate results are not needed, and thus do not need to be stored in cache and can be written over as the operation continues in the register file.

The present invention thus provides a mechanism for doing checksums in the CPU, and thus providing end-to-end coverage for data integrity. In addition, this functionality can be added with minimal hardware, and no extra area, to an existing microprocessor having graphics packed data operations.

As will be understood by those of skill in the art, the present invention may be embodied in other specific forms without departing from the spirit or essential characteristics thereof. For example, the circuitry of FIG. 6 could be modified to provide an actual add of the carry bit to the initial registers, rather than duplicating the registers for a different carry in. Accordingly, the foregoing description is intended to be illustrative, but not limiting, of the scope of the invention which is set forth in the following claims.

What is claimed is:

1. A CPU comprising:
   a first register;
   a second register;
   an adder configured to add in parallel a plurality of first packed values from said first register to a plurality of second packed values in said second register, without a carry over between packed values, to produce a plurality of sum values; and
   a carry bit adder, coupled to said adder, configured to add in parallel any carry bit from each of said plurality of sum values back into the corresponding sum value at a least significant bit.

2. The CPU of claim 1 wherein each of said packed values is 16 bits.

3. The CPU of claim 1 wherein said first and second registers are in a register file, said register file further comprising a plurality of additional registers for storing additional packed values.

4. The CPU of claim 3 further comprising:
a circuit configured to perform a block load of a plurality of packed values into said register file in response to a block load instruction.

5. The CPU of claim 4 further comprising:
a circuit configured to perform a packing of said plurality of first and second packed values into a register.

6. A CPU comprising:
a first register;
a second register;
a first adder configured to add in parallel a plurality of first packed values from said first register to a plurality of second packed values in said second register, without a carry over between packed values and having a value 0 carry-in for a least significant bit of each packed value, to produce a plurality of sum values;
a second adder configured to add in parallel said plurality of first packed values from said first register to said plurality of second packed values in said second register, having a plurality of carry bit inputs of value 1, each connected into a least significant bit of one of said packed values;
a plurality of multiplexers, one for each plurality of pairs of said first and second packed values, each having a packed value from said first mentioned and said second adder connected as inputs; and
a control input to each of said multiplexers coupled to a carry-output of the corresponding packed value of said first adder.

7. A CPU comprising:
a register file having a plurality of registers, including a first register and a second register;
a circuit configured to perform a block load of a plurality of packed values into said register file in response to a block load instruction;
an adder configured to add in parallel a plurality of first packed values from said first register to a plurality of second packed values in said second register, without a carry over between packed values to produce a plurality of sum values; and
a carry bit adder, coupled to said adder, configured to add in parallel any carry bit from each of said plurality of sum values back into the corresponding sum value at a least significant bit.

8. The CPU of claim 7 wherein each of said packed values is 16 bits.

9. The CPU of claim 7 further comprising:
a circuit configured to perform a packing of a plurality of said values into a register.

10. A method for performing a checksum in a CPU, comprising the steps of:
(a) providing first and second registers partitioned to store a plurality of first and second packed values, respectively;
(b) adding in parallel said plurality of first packed values from said first register in said CPU to said plurality of second packed values in said second register in said CPU, without a carry over between packed values;
(c) generating, from said adding step, a plurality of packed sum values and a plurality of carry bits;
(d) adding in parallel a carry bit from each of said plurality of sum values to a least significant bit of corresponding sum value to produce a first result; and
(e) storing said first result.

11. The method of claim 10 wherein each of said packed values comprises 16 bits.

12. The method of claim 10 further comprising repeating steps (a)–(c) and combining a result of said repeated steps with said first result.

13. The method of claim 10 wherein said first and second registers are in a register file, and further comprising the step of performing a block load of a plurality of packed values into a plurality of registers in said register file.

14. A computer system comprising:
a memory;
a bus coupled to said memory; and
a CPU coupled to said bus, said CPU including
a first register,
a second register,
an adder configured to add in parallel a plurality of first packed values from said first register to a plurality of second packed values in said second register, without a carry over between packed values, to produce a plurality of sum values, and
a carry bit adder, coupled to said adder, configured to add in parallel any carry bit from each of said plurality of sum values back into the corresponding sum value at a least significant bit.

* * * * *

UNITED STATES PATENT AND TRADEMARK OFFICE
CERTIFICATE OF CORRECTION

PATENT NO. : 5,953,240
DATED : September 14, 1999
INVENTOR(S) : J. Arjun Prabhu, et. al.

It is certified that error appears in the above-identified patent and that said Letters Patent is hereby corrected as shown below:

In column 8, at line 19, insert --the-- before "corresponding".

Signed and Sealed this

Twelfth Day of September, 2000

Attest:

Q. TODD DICKINSON

*Attesting Officer*    *Director of Patents and Trademarks*